（12）United States Patent
Thompson et al.

(10) Patent No.: US 7,093,447 B2
(45) Date of Patent: Aug. 22, 2006

(54) AUXILIARY POWER UNIT WITH AN OIL-FREE COMPRESSOR

(75) Inventors: Robert G. Thompson, San Diego, CA (US); Bezhad Hagshenas, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 321 days.

(21) Appl. No.: 10/926,164

(22) Filed: Aug. 25, 2004

(65) Prior Publication Data

US 2006/0042270 A1 Mar. 2, 2006

(51) Int. Cl.
*F02C 6/04* (2006.01)

(52) U.S. Cl. ............................. 60/784; 60/786; 60/802

(58) Field of Classification Search .................. 60/784, 60/786, 788, 801, 39.15, 802, 39.091
See application file for complete search history.

(56) References Cited

U.S. PATENT DOCUMENTS

| 2,723,531 | A | * | 11/1955 | Wosika et al. ................. 60/718 |
|---|---|---|---|---|
| 3,951,008 | A | * | 4/1976 | Schneider et al. ............. 74/661 |
| 4,043,119 | A | * | 8/1977 | Faulkner ....................... 60/788 |
| 4,077,202 | A | * | 3/1978 | Schutze ........................ 60/788 |
| 4,433,547 | A | * | 2/1984 | Firey ............................ 60/711 |
| 4,514,976 | A | * | 5/1985 | Christoff ...................... 60/785 |
| 4,542,722 | A | * | 9/1985 | Reynolds ................ 123/179.19 |
| 4,864,812 | A | * | 9/1989 | Rodgers et al. ........... 60/39.091 |
| 4,930,770 | A | * | 6/1990 | Baker ........................... 482/95 |
| 5,015,926 | A | * | 5/1991 | Casler ............................. 318/9 |
| 5,174,109 | A | * | 12/1992 | Lampe ........................ 60/788 |
| 5,408,821 | A | * | 4/1995 | Romero et al. ................ 60/778 |
| 5,555,722 | A | * | 9/1996 | Mehr-Ayin et al. ........... 60/788 |
| 6,035,626 | A | * | 3/2000 | Wahl et al. ................... 60/773 |
| 6,539,926 | B1 | * | 4/2003 | Hakansson et al. .......... 123/495 |
| 6,811,009 | B1 | * | 11/2004 | Inoue et al. ................ 192/48.2 |
| 2002/0046915 | A1 | * | 4/2002 | Inoue et al. ................ 192/48.2 |

* cited by examiner

*Primary Examiner*—William H. Rodriguez
(74) *Attorney, Agent, or Firm*—Stephen G. Mican

(57) ABSTRACT

An auxiliary power unit for aircraft with a load compressor that delivers cabin air free of oil contamination by supporting a drive shaft for the load compressor with oil-free bearings and coupling the load compressor to a gearbox and power head for the auxiliary power unit through a synchronous magnetic torque coupling on an opposite side of the gearbox to which the power is mounted.

9 Claims, 1 Drawing Sheet

AUXILIARY POWER UNIT WITH AN OIL-FREE COMPRESSOR

FIELD OF THE INVENTION

The invention relates to a load compressor for an aeronautical gas turbine-powered auxiliary power unit (APU), and more particularly to an APU that comprises an oil-free load compressor for delivering cabin air to an aircraft.

BACKGROUND OF THE INVENTION

It has become increasingly necessary to improve the quality of cabin air delivered in passenger transport aircraft. Furthermore, aircraft component life requirements have been increased to the point where conventional seals used to isolate machinery oil and oil vapours from cabin air do not have sufficient life to meet the current oil-free environment standard.

For aircraft ground operations during passenger boarding and deplaning, as well as aircraft taxiing, takeoff and landing, the APU conditions cabin air for the support and comfort of passengers and crew members. In connection with a typical pneumatic environmental control system (ECS) that is used on aircraft, the APU is a small gas turbine engine that drives a load compressor and electric power generator. The load compressor pumps atmospheric air to sufficient pressure that when cooled and expanded it conditions hot and humid ambient air to a comfortable cabin air temperature and humidity. Similarly, the compressed air can be controlled to warm the cabin if ambient air is too cold for comfort in the cabin.

Since the APU has oil-lubricated bearings, steps must be taken to assure that lubrication oil does not mix with cabin air supplied by the APU. Labyrinth seals, controlled (radial clearance) gap seals and face seals are currently used in conjunction with sealing air to prevent oil migration from the gearbox and bearings of the APU into the load compressor air supply and ultimately the aircraft cabin air. Unfortunately, the face type seals wear at such a rate that the lubrication oil for the APU gears and bearings eventually migrates into the cabin air between normally scheduled APU overhauls.

SUMMARY OF THE INVENTION

The invention comprises an auxiliary power unit for aircraft that has a load compressor that delivers cabin air free of oil contamination by supporting a drive shaft for the load compressor with oil-free bearings and coupling the load compressor to a gearbox and power head for the auxiliary power unit through a synchronous magnetic torque coupling on an opposite side of the gearbox to which the power is mounted.

In the preferred embodiment, the invention comprises a gas turbine-powered aeronautical auxiliary power unit with a power head coupled to one side of a gearbox through a high-speed shaft that provides cabin air for an aircraft that is free of oil contamination, comprising: a load compressor with a drive shaft supported by oil-free bearings; and an oil-impervious synchronous magnetic torque coupling for coupling the load compressor drive shaft to the high-speed shaft on an opposite side of the gearbox from the power head.

DETAILED DESCRIPTION OF THE INVENTION

Figure 1:
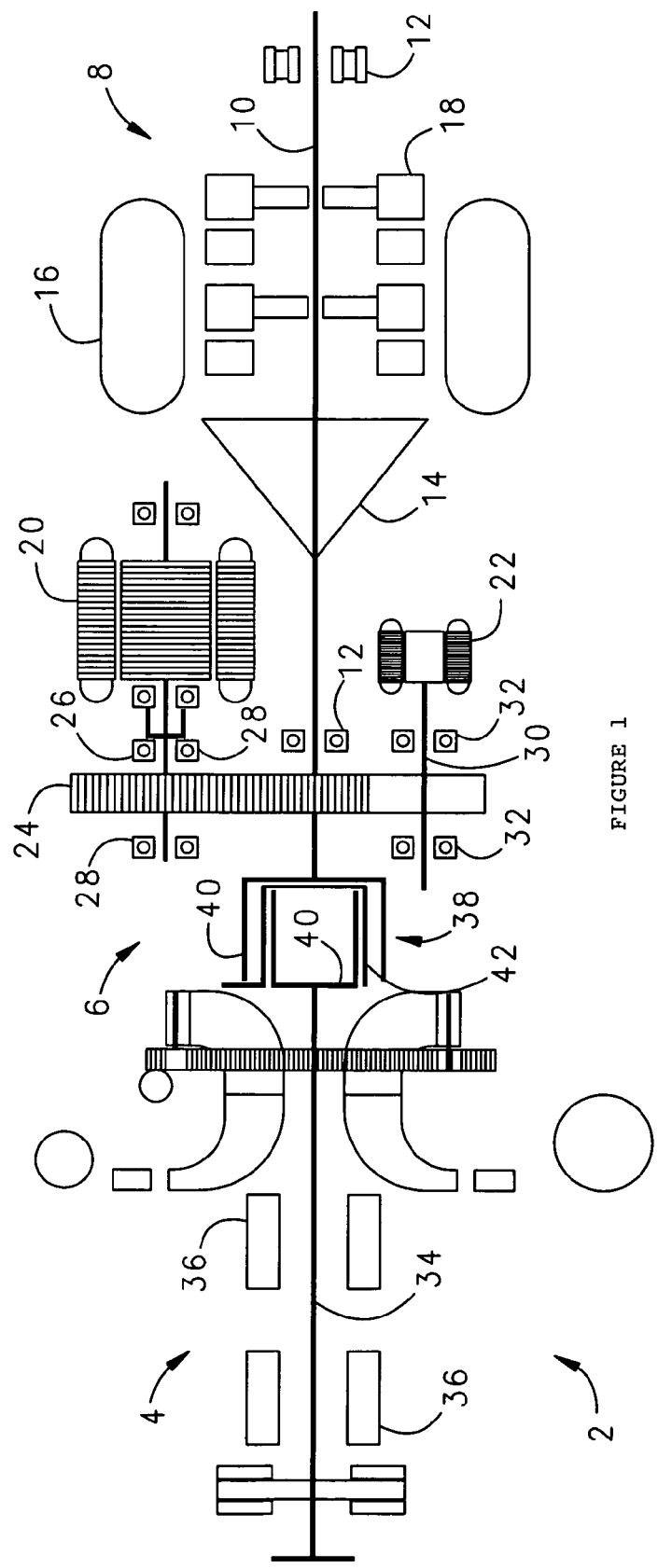
FIG. 1 is a side cut-away view of an APU with an oil-free load compressor according to a preferred embodiment of the invention.

FIG. 1 is a side cut-away view of an APU 2 with an oil-free load compressor 4 according to a preferred embodiment of the invention. The load compressor 4 is mounted on one side of a conventional APU gearbox 6 opposite another side of the gearbox 6 to which a conventional APU power head 8 is mounted. In this configuration, the load compressor 4 is driven at the same shaft speed as the power head 8.

According to the prior art, it has been usual practice to couple the load compressor 4 to the gearbox 6 on the same side of the gearbox 6 as the power head 8, with the load compressor 4 mounted on a common high-speed shaft 10 supported by high speed shaft bearings 12 with the power head 8. Locating the load compressor 4 on a side of the gearbox 6 opposite the power head 8 isolates the load compressor 4 from power head bearings 12 and lubrication oil for the power head 8.

The power head 8 is conventional, and comprises a cycle compressor 14, combustor 16 and drive turbine 18, as well known in the art. The high-speed shaft 10 supported by the power head bearings 12 joins and couples the power head 8 to the gearbox 6.

The power head 8 connects to the gearbox 6 through the high-speed shaft 10 to couple typical APU electric components to the power head 8, such as an electrical generator 20 for supplying electrical power to the aircraft when the propulsion engines of the aircraft are not in operation, and an electrical starter 22 for starting the APU 2. The power head 8 drives the electrical generator 20 through reduction gearing 24 in the gearbox 6 and a generator output shaft 26 supported by generator bearings 28. The starter motor 22 drives the power head 8 during start-up through a starter input shaft supported by starter motor bearings 32 and the reduction gearing 24 in the gearbox 6. All of the bearings 12, 28 and 32 are typically of the oil lubricated rolling element type.

A drive shaft 34 supported by oil-free bearings 36, such as air or electromagnetic bearings, couples the load compressor 4 to the high-speed shaft 10 on the side of the gearbox 6 opposite the power head 8 through a synchronous magnetic torque coupling 38. The synchronous magnetic torque coupling 38 comprises inner and outer concentric permanent magnet (PM) arrays 40 that are fluidically and mechanically isolated from each other by an oil barrier diaphragm 42. The PM arrays 40 transmit torque magnetically through the diaphragm 42.

Since the diaphragm 42 is impervious to oil, there is no possible way for oil to travel from the oiled gearbox 6 or power head 8 into the cabin air supplied by the load compressor 4. The load compressor 4 has no oil-lubricated bearings, since the oil-free bearings 36 support its drive shaft 34. Therefore, there is no possible way for the load compressor 4 itself to contaminate air that it supplies to the cabin with oil.

Described above is an auxiliary power unit for aircraft with a load compressor that delivers cabin air free of oil contamination by supporting a drive shaft for the load compressor with oil-free bearings and coupling the load compressor to a gearbox and power head for the auxiliary power unit through a synchronous magnetic torque coupling on an opposite side of the gearbox to which the power is mounted. It should be understood that this embodiment is only an illustrative implementation of the invention, that the various parts and arrangement thereof may be changed or substituted, and that the invention is only limited by the scope of the attached claims.

What is claimed is:

1. A gas turbine-powered aeronautical auxiliary power unit (APU) with a power head coupled to one side of a gearbox through a high-speed shaft that provides cabin air for an aircraft that is free of oil contamination, comprising:
    a load compressor with a drive shaft supported by oil-free bearings; and
    an oil-impervious synchronous magnetic torque coupling for coupling the load compressor drive shaft to the high-speed shaft on an opposite side of the gearbox from the power head.

2. The APU of claim 1, wherein the oil-free bearings comprise air bearings.

3. The APU of claim 1, wherein the oil-free bearings comprise electromagnetic bearings.

4. The APU of claim 1, wherein the magnetic torque coupling comprises inner and outer concentric permanent magnet (PM) arrays that are fluidically and mechanically isolated from each other by an oil barrier diaphragm.

5. The APU of claim 4, wherein the load compressor drive shaft is connected to one of the concentric PM arrays and the high-speed shaft is connected to the other one of the concentric PM arrays.

6. A gas turbine-powered aeronautical auxiliary power unit (APU) with a power head coupled to one side of a gearbox through a high-speed shaft that provides cabin air for an aircraft that is free of oil contamination, comprising:
    a load compressor with a drive shaft supported by air bearings; and
    an oil-impervious synchronous magnetic torque coupling comprising inner and outer concentric permanent magnet (PM) arrays that are fluidically and mechanically isolated from each other by an oil barrier diaphragm for coupling the load compressor drive shaft to the high-speed shaft on an opposite side of the gearbox from the power head.

7. The APU of claim 6, wherein the load compressor drive shaft is connected to one of the concentric PM arrays and the high-speed shaft is connected to the other one of the concentric PM arrays.

8. A gas turbine-powered aeronautical auxiliary power unit (APU) with a power head coupled to one side of a gearbox through a high-speed shaft that provides cabin air for an aircraft that is free of oil contamination, comprising:
    a load compressor with a drive shaft supported by electromagnetic bearings; and
    an oil-impervious synchronous magnetic torque coupling comprising inner and outer concentric permanent magnet (PM) arrays that are fluidically and mechanically isolated from each other by an oil barrier diaphragm for coupling the load compressor drive shaft to the high-speed shaft on an opposite side of the gearbox from the power head.

9. The APU of claim 8, wherein the load compressor drive shaft is connected to one of the concentric PM arrays and the high-speed shaft is connected to the other one of the concentric PM arrays.

* * * * *